United States Patent [19]

Wysong

[11] 4,052,076
[45] Oct. 4, 1977

[54] SCREW SEAL

[75] Inventor: Paul V. Wysong, Sepulveda, Calif.

[73] Assignee: Schrillo Company, Sepulveda, Calif.

[21] Appl. No.: 700,546

[22] Filed: June 28, 1976

[51] Int. Cl.² .............................................. F16J 15/16
[52] U.S. Cl. ........................................ 277/24; 74/459; 277/203
[58] Field of Search ................. 277/24, 165, 167, 203, 277/70; 74/459

[56] References Cited
U.S. PATENT DOCUMENTS

| 2,757,548 | 8/1956 | Smith et al. | 74/459 |
| 3,116,931 | 1/1964 | Edwards | 277/165 |
| 3,304,794 | 2/1967 | Bird | 74/459 |
| 3,669,460 | 6/1972 | Wysong | 277/24 |
| 3,678,776 | 7/1972 | Patterson | 74/459 |
| 3,851,541 | 12/1974 | Ploss et al. | 74/459 |

Primary Examiner—Richard E. Aegerter
Assistant Examiner—L. Footland
Attorney, Agent, or Firm—Blakely, Sokoloff, Taylor & Zafman

[57] ABSTRACT

An improved screw seal for providing a dynamic seal between a screw and a nut is disclosed. A carrier for the screw seal includes a chipper, wiper, and a sealing member. The wiper includes a wiper seal and a drain groove which cooperate to remove lubricants from the surface of the screw and direct them between the nut and screw.

5 Claims, 10 Drawing Figures

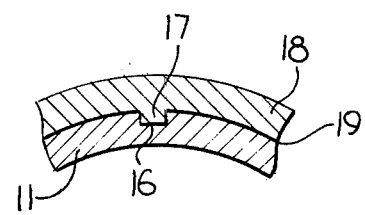
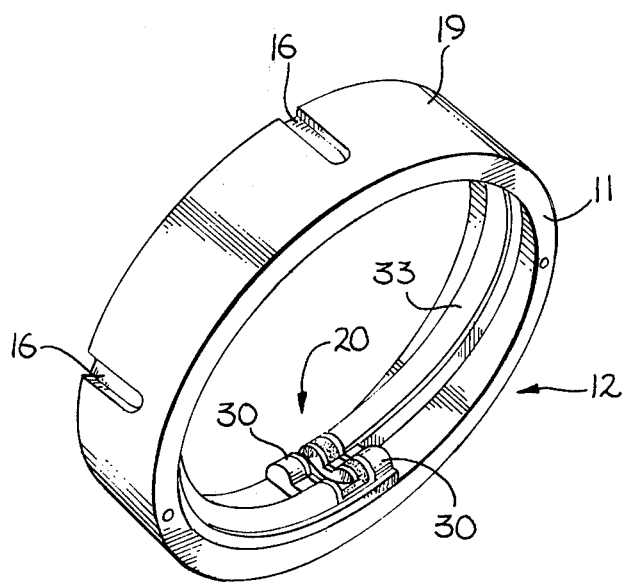
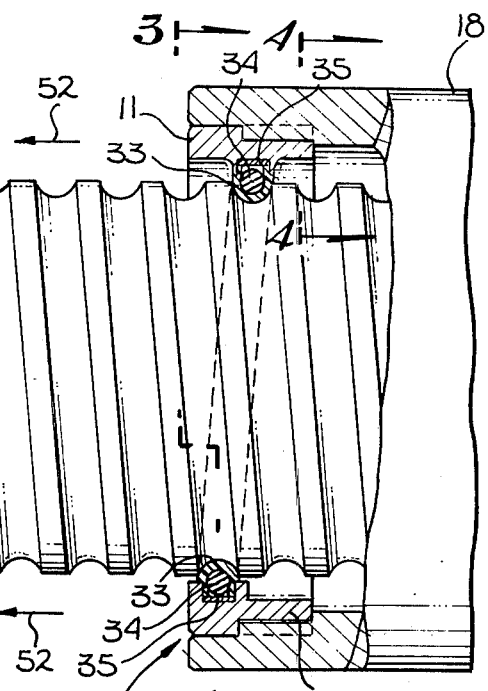
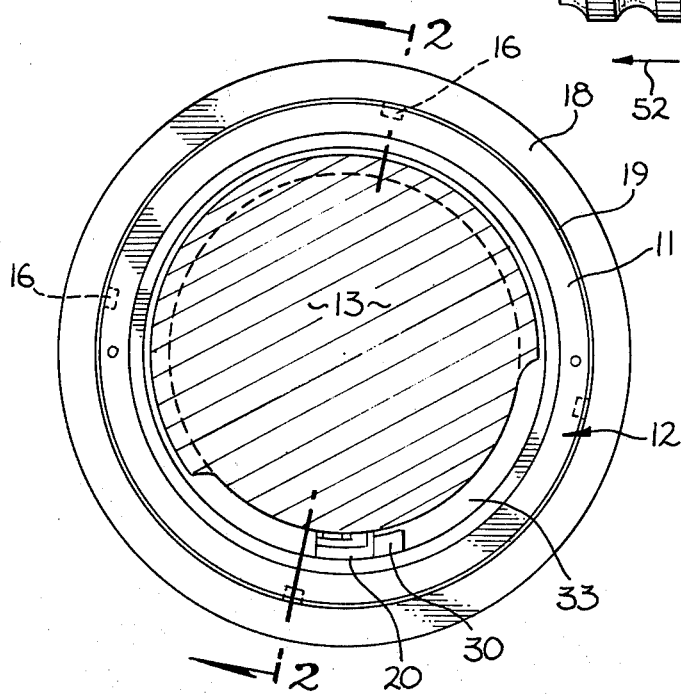

SCREW SEAL

BACKGROUND OF THE INVENTION

1. Field of the Invention

This invention relates to sealing means for use on screws.

2. Prior Art

It is often necessary to retain lubricants between a screw and a nut, particularly where the screw and nut are subjected to large loads in hostile environments. Such an application is the recirculating ball screws used to raise and lower the flaps of many commerical jet aircraft. In many of these applications a screw seal is coupled at the opposite ends of the nut for retaining lubricants between the nut and screw.

In applicant's prior screw seal disclosed in U.S. Pat. No. 3,669,460 a screw seal carrier which includes a chipping surface, wiping surface, and a sealing member is employed. The chipping surface is used to chip away foreign matter on the screw. The wiping surface wipes the screw of lubricants and the sealing member is employed to form the seal between the nut and screw. While this screw functions satisfactorily, some repeatability problems have been encountered with its use. These problems are caused, in part, by dimensional variations in the screws.

The present disclosure describes an improved screw seal, and more particularly a screw seal with an improved wiper. As will be desribed in more detail, the wiper includes a sealing means and a drain groove to direct lubricants between the nut and screw.

SUMMARY OF THE INVENTION

A screw seal for retaining lubricants between a screw and a nut is described. The screw seal is retained in a generally cylindrical carrier which engages a nut. The carrier defines a pair of chippers which extend into adjacent grooves of the screw. A wiper is mounted within the carrier between the chippers; the wiper also extends into adjacent grooves of the screw. A sealing member is helically disposed within the interior of the carrier from one edge of the wiper to an opposite edge of the wiper in the adjacent groove. Thus as relative rotation occurs between the carrier and the screw, in either direction, the chipper first advances in the groove followed by the wiper and the sealing member.

The wiper includes a polyurethane wiper seal in intimate contact with grooves of the screw. A drain groove is included in the wiper adjacent to the wiper seal so that lubricants wiped by the wiper seal are returned between the screw and nut.

BRIEF DESCRIPTION OF THE DRAWINGS

FIG. 1 is a general perspective view of the screw seal.

FIG. 2 is a partially cutaway elevation view of a screw, nut and the screw seal taken generally along section line 2—2 of FIG. 3.

FIG. 3 is an end view of the screw, nut and screw seal of FIG. 2 taken along the staggered section line 3—3 of FIG. 2.

FIG. 4 is a partial cross-sectional view of the nut and screw seal carrier used to illustrate the coupling between the nut and screw seal carrier. This view is taken along section line 4—4 of FIG. 2.

DETAILED DESCRIPTION OF THE INVENTION

Figure 5:
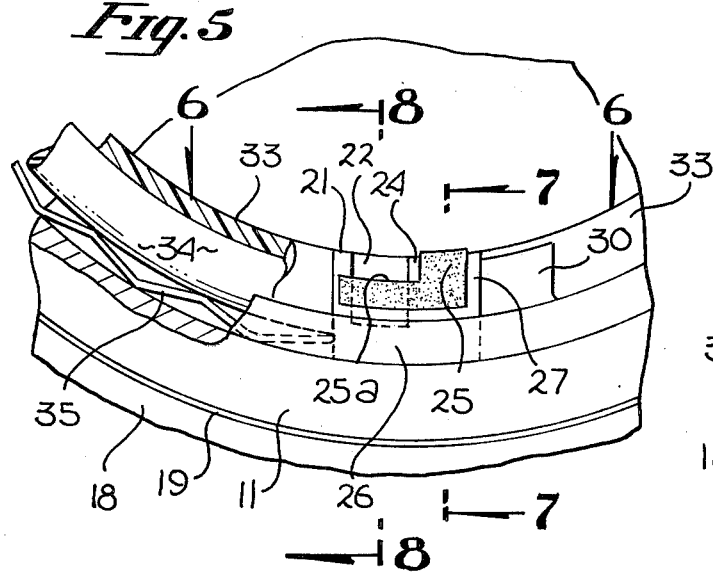
FIG. 5 is a partial cross-sectional, end view of the screw seal.

A screw seal for providing a dynamic seal between a screw and a nut is described. The seal is particularly useful in applications where recirculating ball screws are employed or where a lubricant reservoir is contained within the nut.

Referring first to FIG. 1 the presently preferred embodiment of the screw seal 12 is secured in a generally cylindrical carrier 11 which is adaptable for engaging a lead screw such as screw 13 shown in FIGS. 2 and 3. The three major components of the screw seal are (1) chippers 30 employed for dislodging debri from the screw, (2) a wiper 20 used to wipe lubricants from the screw, and (3) a helical sealing member 33 which sealingly engages a groove of the screw 13. These major components of the seal screw are known in the prior art and are described in U.S. Pat. No. 3,669,460, however, as will be apparent, several improvements are described in this application, particularly in the wiper 20.

Figure 7:
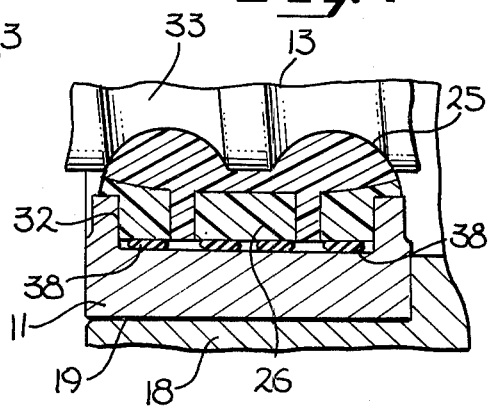
FIG. 7 is a partial cross-sectional elevation view of the screw seal and in particular of the wiper taken along section line 7—7 of FIG. 5.

In the presently preferred embodiment the carrier 11 is fabricated from nickel, however, other metals may be employed. A plurality of drive slots 16 are axially disposed about the exterior of the carrier 11. These drive slots cooperatively engage ridges 17 (FIG. 4) of the nut 18 so that the screw seal 12 may be driven with the nut 18. The exterior surface of carrier 11 is coated with a layer 19 of Teflon (tetrafluoroethylene). The layer 19 permits the screw seal 12 to float within the nut 18. This allows the various elements associated with the screw seal 12 to better seat on the screw 13. The interior of the carrier 11 in the presently preferred embodiment forms the chippers 30, a pair of helical ribs 28 (FIG. 6) for supporting the sealing member 33, and a cavity 32 (FIGS. 7 and 8) for receiving the wiper 20.

Figure 6:
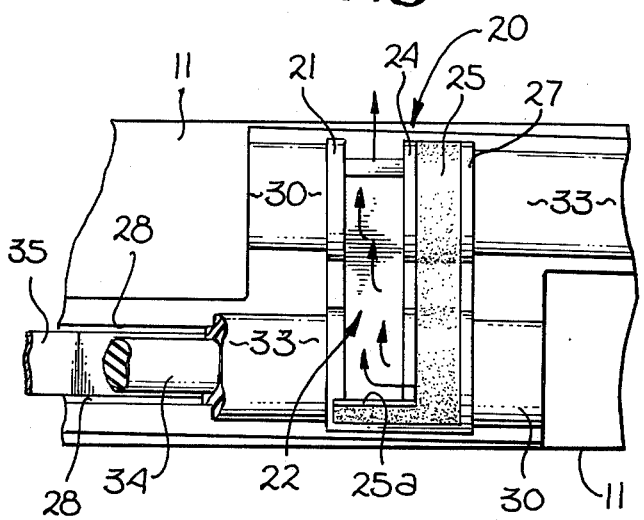
FIG. 6 is a partial plan view of the screw seal taken along section line 6—6 of FIG. 5.

Referring to the figures and in particular FIGS. 1, 5 and 6, the pair of chippers 30 extend into adjacent grooves of the screw and are spaced-apart circumferentially with the wiper 20 disposed therebetween. That is, the chippers are spaced-apart along the helix of the screw by an angle greater than 360°. The chippers 30 do not contact the groove of the screw but rather, in the presently preferred embodiment, are spaced-apart from the groove by approximately 0.005 inches.

The sealing member 33 is helically disposed within the carrier 11 from one edge of the wiper 20 to an opposite edge of the wiper in an adjacent groove. As is best illustrated in FIGS. 5 and 6 the sealing member 33 is secured in place between the carrier ribs 28. A spreader ring 34, primarily used to prevent wave spring 35 from sliding relative to sealing member 33, is disposed directly beneath the member 33. Wave spring 35 is included between the ribs 28 to urge sealing member 33 into intimate contact with the groove of the screw. In the presently preferred embodiment the sealing member comprises DELRIN 500 or DUROID 4000. The spreader ring 34 may comprise a rubber or felt member and an ordinary metal spring may be employed for spring 35.

Figure 8:
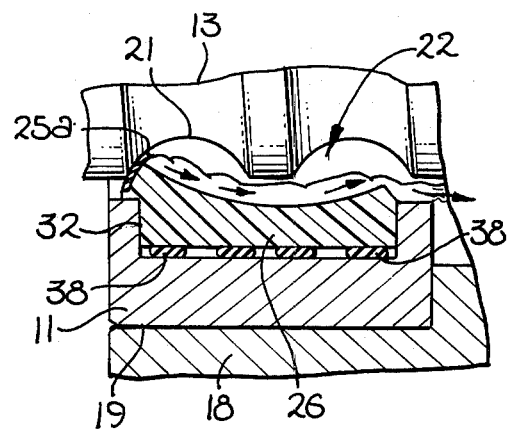
FIG. 8 is a partial cross-sectional elevation view of the screw seal which illustrates the drain groove of the wiper. This view is taken along section8—8 of FIG. 5.
Figure 9:
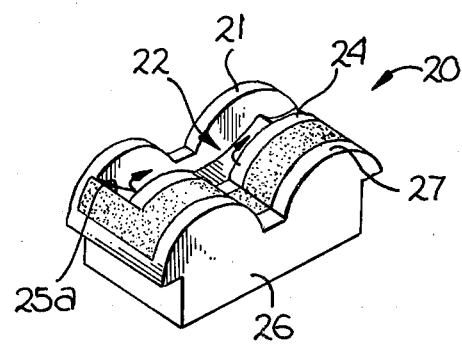
FIG. 9 is a perspective view of the wiper.

Referring primarily to FIG. 9 the wiper body 26 comprises DELRIN 500 in the presently preferred embodiment, however, any one of a plurality of other known materials may be employed. The upper surface of the body 26 forms three members or lands 21, 24 and 27. Each of these spaced-apart, parallel lands are shaped for engaging adjacent grooves of the screw. The groove between the wiper lands 21 and 24 forms a drain groove 22. As is best illustrated in FIG. 8 one end of the base of drain groove 22 is higher to support a section 25a of a wiper seal in contact with the edge of a screw groove. The central portion of drain groove 22 and the other end of the drain groove is shaped to allow lubricants to flow below the lands of the screw grooves in a direction generally parallel to the axis of screw 13. Thus flow in the drain groove only occurs in the direction of the arrows of FIG. 8.

A resilient wiper seal 25 is included between the lands 24 and 27 of the wiper and closely contoured to these lands. The wiper seal 25 includes a section 25a which extends generally transverse to the direction of flow within the drain groove 22. Section 25a is best illustrated in FIGS. 5, 6, 8 and 9. In the presently preferred embodiment the seal 25 comprises polyurethane, however other sealing materials may be employed.

The wiper 20 engages the cavity 32 in the carrier 11; a pair of resilient 0-rings 38 are employed to urge the lands 21, 24 and 25 against the screw. The resilient seal 25 is raised slightly above the lands to accommodate minute variations in groove form and tolerance. Moreover, the typical lubricants employed with screws and nuts cause the polyurethane seal 25 to expand slightly, thereby providing a better seal between the wiper seal 25 and the two adjacent screw grooves and the intermdiate land. Also as is best illustrated in FIG. 8 the section 25a of seal 25 engages the edge of a screw groove, sealing one end of the drain groove 22.

In a typical application a pair of screw seals 12 are coupled to opposite ends of a nut, one such seal is shown in FIGS. 2 and 3. The screw seals 12 are placed within the ends of the nut such that section 25a of the wiper seal 25 is on the exterior (exposed) surface of the screw seal. In the presently preferred embodiment, wiper 20 with its integrally molded seal 25 is first exposed to a petroleum distillate, such as kerosene, in order to swell the seals 25 prior to assembly and installation on a screw. Swelling in the order of 0.003 to 0.005 inches occrus. Internal exposure to the typical lubricants employed maintain this relationship. It should be noted that the seal 25 is surrounded by wiper 20 except at its upper surface. Thus the net swelling only occurs in the uncontained direction, that is towards the screw.

As may be seen particularly in FIGS. 1 and 2 when relative rotation occurs between the screw seal and screw (in either direction) first the chipper 30 precedes along a groove followed by the wiper 20 and then the sealing member 33. As mentioned the wiper 20 is employed to wipe lubricants from the screw and through the drain groove 22 directs these lubricants in a direction transverse to the screw grooves, back between the nut and the screw. For this reason when screw seals 12 are disposed at opposite ends of the nut both drain grooves 22 provide flow paths directed into the volume (such as a lubricant reservoir employed in some ball screws) between the screw and nut.

For sake of discussion, assume that the lead screw 13 of FIG. 2 is advancing in the direction indicated by arrow 52. As this occurs, insofar as the wiper 20 is concerned, first member or land 21 (FIGS. 5, 6 and 9) advances along the grooves. This member while not in intimate contact with the grooves, nonetheless removes some lubricants from the grooves. Following the land 21 the seal 25 which is in intimate contact with the screw grooves and intermediate land, urges lubricants from the screw into the adjacent drain groove 22. Since section 25a of the seal 25 prevents the lubricants from flowing outwardly from the screw seal the lubricants are directed along the screw back between the screw and nut. This is illustrated graphically in FIG. 8. Note that since the seal 25 engages two adjacent grooves, each groove of the screw is wiped twice by the seal 25.

Figure 10:
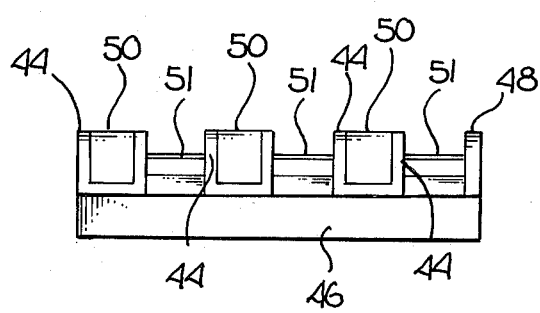
FIG. 10 is a side view of an alternate embodiment of the wiper employed in the screw seal.

In FIG. 10 an alternate embodiment of the wiper 20 is illustrated which includes a plurality of seals, such as seal 25. In FIG. 10 the illustrated wiper body 46 includes a plurality of lands or members 44 and 48. The land 48 corresponds to the land 21 of the wiper 20. A drain groove 51 is disposed between the land 48 and the next land 44. A seal 50 which corresponds to seal 25 of FIG. 9 is included between the next two lands 44. Then alternately along the body 46 drain grooves 51 and seals 50 are employed. In this embodiment the plurality of seals 50 with the adjacent drain grooves 51 allow the grooves of the screw to be wiped several times and for the lubricants to be drained through the plurality of drain grooves 51.

Thus a reliable, low drag screw seal has been described which includes an improved wiper. The wiper employs a seal in intimate contact with the grooves of the screw and an adjacent drain groove which directs lubricants wiped from the screw grooves back along the screw, between the nut and screw.

I claim:
1. A screw seal comprising:
   a generally cylindrical carrier having an interior for engaging a screw;
   a wiper body engaging said carrier;
   a first, second and third spaced-apart parallel lands with arcuate radially inner sections extending radially inwardly into said interior of said carrier from said wiper body, said lands generally parallel to the axis of said carrier;
   a wiper seal disposed between said second and third lands and facing inwardly into said interior of said carrier;
   a drain groove defined between said first and second lands, said groove parallel to the axis of said carrier and extending radially outwardly beyond the inner most surface of said wiper seal;
   whereby when said lands engage a screw, lubricants wiped by said wiper seal flow in said drain groove generally parallel to the axis of such screw, such lubricants may thus be retained within a nut, ball screw, or the like which is coupled to said screw seal; and including a sealing member helically disposed within said interior of said carrier from opposite sides of said wiper body.

2. The screw seal defined by claim 1 wherein said wiper seal includes a transverse section which extends across one end of said drain groove.

3. The screw seal defined by claim 2 wherein said wiper seal comprises polyurethane.

4. The screw seal defined by claim 3 wherein the exterior of said carrier includes a layer of tetrafluoroethylene.

5. The screw seal defined by claim 1 wherein said wiper body includes additional spaced-apart parallel lands and at least one additional wiper seal, said additional lands defining at least one additional drain groove.

* * * * *